（12）United States Patent
Jonsson et al.

(10) Patent No.: US 8,861,623 B2
(45) Date of Patent: *Oct. 14, 2014

(54) METHOD AND APPARATUS FOR ALLOCATING PROCESSING DELAYS IN MULTI-CARRIER SYSTEMS

(75) Inventors: Elias Jonsson, Malmö (SE); Oskar Drugge, Lund (SE); Douglas A. Cairns, Durham, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1324 days.

This patent is subject to a terminal disclaimer.

(21) Appl. No.: 12/472,742

(22) Filed: May 27, 2009

(65) Prior Publication Data

US 2010/0303132 A1     Dec. 2, 2010

(51) Int. Cl.
*H04K 1/10* (2006.01)
*H04L 27/28* (2006.01)
*H04B 1/7117* (2011.01)
*H04L 25/02* (2006.01)

(52) U.S. Cl.
CPC .......... *H04B 1/7117* (2013.01); *H04L 25/0202* (2013.01)
USPC ....................................................... 375/260

(58) Field of Classification Search
CPC ................ H04L 27/2607; G02B 6/29341
USPC .................. 375/260, 147, 148, 150, 143, 200
See application file for complete search history.

(56) References Cited

U.S. PATENT DOCUMENTS

| | | | |
|---|---|---|---|
| 6,744,821 B1 * | 6/2004 | Van Acker et al. | 375/260 |
| 6,791,964 B1 * | 9/2004 | Hwang et al. | 370/342 |
| 7,085,311 B2 | 8/2006 | Iwasaki | |
| 7,277,474 B2 | 10/2007 | Sharma et al. | |
| 2002/0080862 A1 * | 6/2002 | Ali | 375/148 |
| 2004/0072553 A1 * | 4/2004 | Wang et al. | 455/334 |
| 2005/0018758 A1 | 1/2005 | Keranen et al. | |
| 2006/0083292 A1 * | 4/2006 | Khayrallah et al. | 375/148 |
| 2008/0310485 A1 * | 12/2008 | Soliman et al. | 375/147 |
| 2009/0116575 A1 * | 5/2009 | Hochwald et al. | 375/267 |

FOREIGN PATENT DOCUMENTS

| | | |
|---|---|---|
| GB | 2350986 A | 12/2000 |
| WO | 01/52468 A1 | 7/2001 |
| WO | 2008/031761 A1 | 3/2008 |
| WO | 2010/039156 A1 | 4/2010 |

OTHER PUBLICATIONS

Author Unknown. "CDMA Cellular Radio Systems Research." Publication date unknown. Article available online at: http://www.tech.plym.ac.uk/see/research/CDMA/CDMAIntro.htm.
Hara, S. et al. "Overview of Multicarrier CDMA." IEEE Communications Magazine, Dec. 1997, pp. 126-133.

* cited by examiner

*Primary Examiner* — Chieh M Fan
*Assistant Examiner* — Wednel Cadeau
(74) *Attorney, Agent, or Firm* — Coats & Bennett, PLLC

(57) ABSTRACT

A multi-carrier linear equalization receiver, e.g., a RAKE receiver or chip equalization receiver, is described herein. The multi-carrier receiver distributes processing delays among a plurality of received carriers based on a dispersion determined for each carrier. The receiver initially allocates a minimum number of processing delays sufficient for light dispersion to each carrier. For the dispersive carriers, the receiver allocates one or more additional processing delays. In one embodiment, the additional processing delays are allocated to the dispersive carriers based on SIR.

18 Claims, 6 Drawing Sheets

METHOD AND APPARATUS FOR ALLOCATING PROCESSING DELAYS IN MULTI-CARRIER SYSTEMS

BACKGROUND

The present invention relates generally to wireless receivers, and more particularly to processing delay allocation for multi-carrier receivers that receive multi-path signals.

Wireless signals often travel multiple propagation paths between a transmitter and an intended receiver. As a result, the intended receiver receives a composite signal that includes multiple images of a transmitted signal, where each image generally experiences different path delay, phase, and attenuation effects. Different signal images therefore arrive at the receiver at different times, causing a delay spread between the received signal images. The maximum delay spread between signal images depends on, among other things, the differing characteristics of the signal propagation paths.

Because the signal energy is distributed among the multiple signal images, wireless devices often use a receiver that combines the received signal images to improve the signal-to-noise ratio (SNR) of the output signal, e.g., a RAKE receiver. RAKE receivers include a plurality of RAKE fingers tuned to different delays to despread signal images. Typically, the RAKE receiver tunes its available RAKE fingers to the strongest signal images, such that each selected signal image is despread, weighted, and subsequently combined with the other selected and despread signal images. Combining multiple signal images in this manner generally improves the SNR of the received signal.

To improve wireless data rates, wireless communication systems may also use different frequency carriers for different users. To compensate for multi-path propagation issues associated with each carrier, receivers in such multi-carrier systems may include one RAKE receiver subsystem for each carrier, where each RAKE receiver subsystem includes a fixed number of RAKE fingers. Ideally, each RAKE receiver subsystem includes enough fingers to adequately process the received signal for the corresponding carrier. However, because receiver complexity increases as the number of fingers increases, the ideal finger distribution is not always possible.

SUMMARY

The present invention provides methods and apparatuses for a multi-carrier receiver that distributes processing delays among a plurality of received carriers based on a channel dispersion determined for each carrier. As used herein, the term "processing delay" generally refers to the delay(s) associated with multi-path receiver structures. For example, processing delay(s) as used herein may refer to the delays associated with fingers for symbol level receiver structures (e.g., RAKE or generalized RAKE receivers), tap delay(s) for the linear filter(s) used by chip equalization receiver structures, etc. The receiver may use the root mean square (RMS) delay spread as an indicator of the channel dispersion. The multi-carrier receiver may be realized in a wireless communication device as a multi-carrier linear equalization receiver, e.g., a multi-carrier symbol equalization receiver such as a RAKE or generalized RAKE receiver, or a multi-carrier chip equalization receiver.

In one embodiment, the receiver allocates a minimum number of processing delays to each carrier. Each lightly dispersive carrier, e.g., those carriers having a channel dispersion less than a dispersion threshold, is only allocated the minimum number of processing delays. However, additional processing delays are distributed among the more dispersive carriers, e.g., those carriers having a channel dispersion greater than or equal to a dispersion threshold. In one exemplary embodiment, the additional processing delays are distributed among the dispersive carriers based on a comparison between the signal-to-interference ratios (SIRs) determined for the dispersive carriers. For example, the receiver may distribute the additional processing delays among the dispersive carriers to favor the carriers with the larger SIRs when the comparison between the largest and smallest SIR meets a second criteria, e.g., is greater than a threshold.

By using dispersion, and in some cases SIR comparisons, to distribute the processing delays, the present invention enables system designers to limit the total number of available processing delays without sacrificing performance. Further, the dispersion-based aspect of the present invention, has one key advantage. The RMS delay spread metric is easily computed and reliably indicates channel dispersion. Further still, the present invention is simple and can allocate processing delays without needing past or future information, which eliminates the need for buffering.

DETAILED DESCRIPTION

Figure 1:
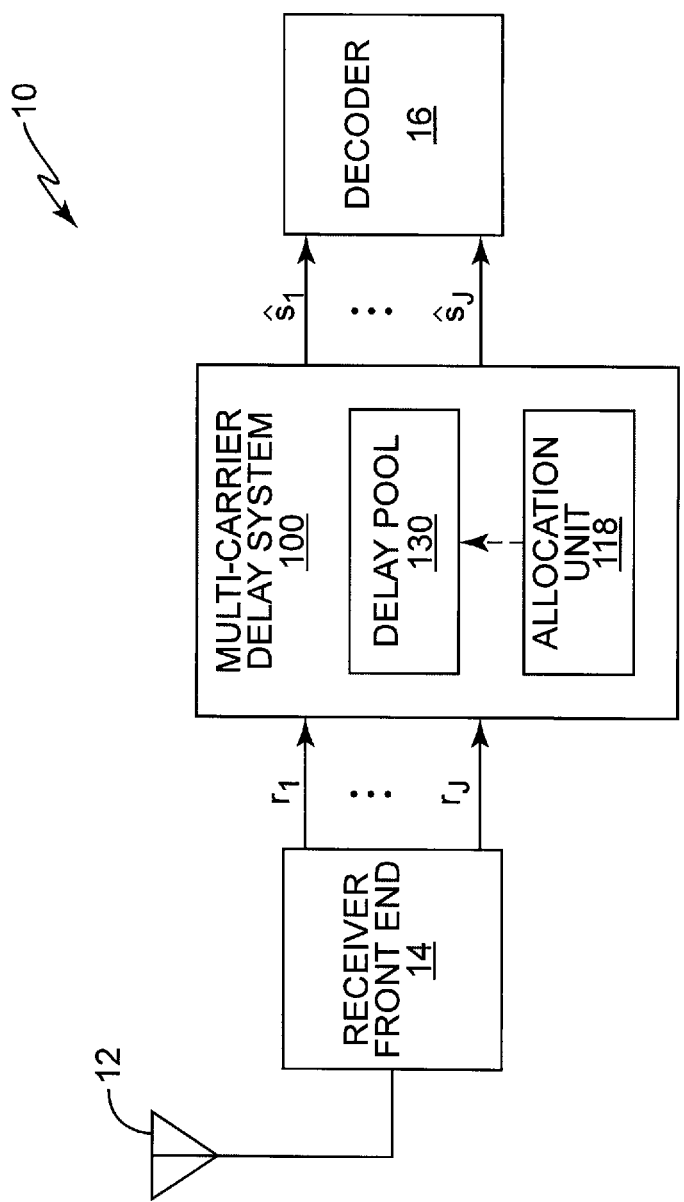
FIG. 1 shows a block diagram of an exemplary multi-carrier receiver according to one embodiment of the present invention.

FIG. 1 shows a block diagram of a multi-carrier linear equalization receiver 10 according to one embodiment of the present invention. Receiver 10 includes one or more antennas 12, receiver front-end 14, multi-carrier tap system 100, and decoder 16. Front-end 14 amplifies, filters, and downconverts the signal received by the antenna(s) 12 to generate a baseband signal $r_j$ for each of the J carriers. Multi-carrier tap system 100 may comprise any linear equalization receiver system, e.g., a symbol equalization receiver system, chip equalization receiver system, etc., that separately processes the baseband signal images associated with different carriers to generate symbol estimates $\hat{s}_j$ for each carrier. The decoder 16 processes the symbol estimates output by the multi-carrier tap system 100 to recover the transmitted information bits for each carrier.

Typical multi-carrier linear equalization receivers include a separate linear equalization subsystem for each carrier, where each linear equalization subsystem includes a fixed number of processing delays for each carrier. As used herein, the term "processing delay" generally refers to the delay(s) associated with multi-path receiver structures. For example, processing delay(s) as used herein may refer to the delays associated with fingers for symbol level receiver structures (e.g., RAKE or generalized RAKE receivers), tap delay(s) for the linear filter(s) used by chip equalization receiver structures, etc. When designed for a large number of carriers, the excessively large number of processing delays required for the separate subsystems makes the receiver prohibitively complex. Further, a fixed allocation is inefficient; there will be some circumstances where the linear equalization subsystem for one carrier has more processing delays than necessary, while the linear equalization subsystem for another carrier does not have enough processing delays.

The multi-carrier linear equalization system 100 of the present invention solves this problem by providing an allocation unit 118 that distributes the processing delays in a common delay pool 130 of $N_{total}$ processing delays among the carriers. The allocation unit 118 determines the number of processing delays to allocate to each carrier based on the channel conditions associated with each carrier. When the common delay pool 130 has enough processing delays to give each carrier the desired number of processing delays, the allocation unit 118 allocates the desired number of processing delays to each carrier. However, when the common pool of carriers 130 does not include enough processing delays to give each carrier the desired number of processing delays, allocation unit 118 distributes the processing delays among the carriers based on the channel conditions.

To distribute the processing delays among the carriers when the number of desired processing delays exceeds the number of processing delays in the delay pool 130, the allocation unit 118 initially allocates a predetermined minimum number of processing delays to each antenna of each carrier. The minimum number of processing delays is generally sufficient for lightly dispersive carriers. Subsequently, allocation unit 118 determines how to allocate any remaining additional processing delays, e.g., the $N_{add\_total}=N_{total}-N_{min\_total}$ remaining processing delays. For example, the allocation unit 118 may determine a root mean square (RMS) delay spread metric, which is a reliable indicator of channel dispersion, for each carrier, and distribute the processing delays among the carriers based on the channel dispersion. Allocation unit 118 does not allocate any additional taps to the lightly dispersive carriers. However, allocation unit 118 distributes the additional processing delays remaining in the delay pool 130 after the initial allocation between the more dispersive carriers according to a selected distribution process.

For example, allocation unit 118 may first determine $\tilde{N}_{i\_add}$, the number of additional processing delays desired by each of the i$\{1, 2, \ldots, I\}$ dispersive carriers, where I≤J. Allocation unit 118 may compute the desired number of additional taps for each dispersive carrier as a function of the delay spread associated with each carrier. For example, the allocation unit 118 may determine the desired number of additional processing delays for a dispersive carrier by dividing the maximum delay spread for the dispersive carrier by a desired granularity, e.g., half chip, quarter chip, etc., and then subtracting the minimum number of processing delays already allocated to the carrier.

When the total number of desired additional processing delays does not exceed the remaining additional processing delays in the delay pool 130, e.g., when $$\sum_{i=1}^{I} \tilde{N}_{i\_add} \leq N_{add\_total},$$

allocation unit 118 allocates the desired number of additional processing delays to each dispersive carrier, e.g., $N_{i\_add}=\tilde{N}_{i\_add}$. Because the total number of additional processing delays in the delay pool 130 may be limited to reduce receiver complexity, multi-carrier linear equalization system 100 may not always have enough additional processing delays to give each dispersive carrier the desired amount. When the total number of desired additional processing delays for the dispersive carriers exceeds the total number of additional processing delays in the delay pool 130, e.g., $$\sum_{i=1}^{I} \tilde{N}_{i\_add} > N_{add\_total},$$

the allocation unit 118 of embodiments of the present invention distributes the additional processing delays among the I dispersive carriers, e.g., based on the I signal-to-noise ratios (SIRs) computed for the dispersive carriers.

Figure 2:
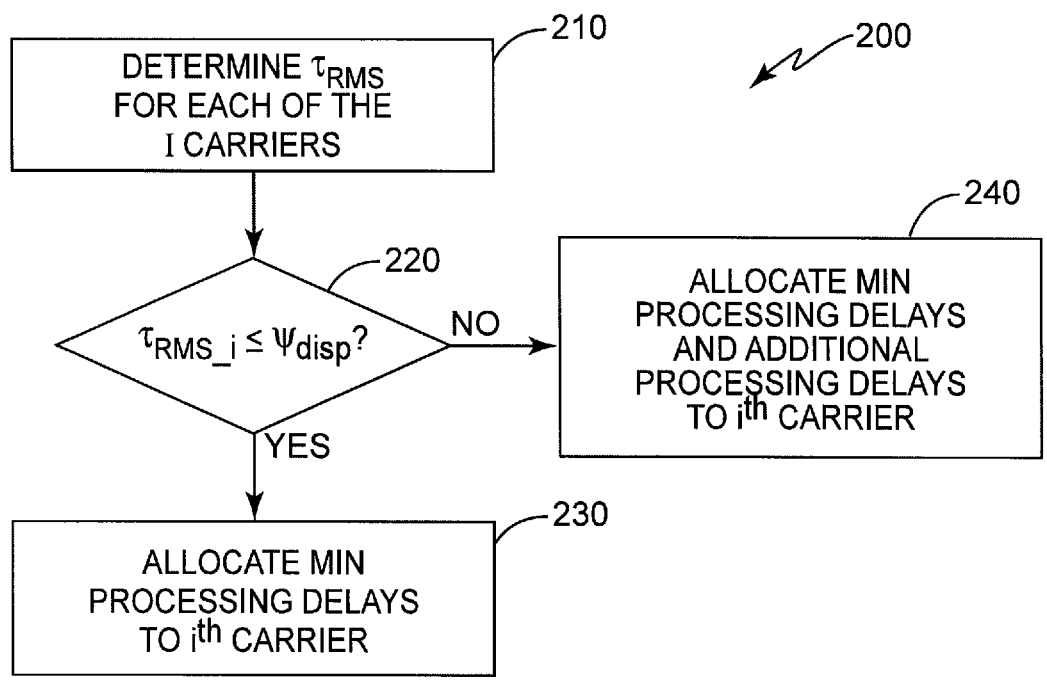
FIG. 2 shows an exemplary dispersion-based method for distributing processing delays among carriers according to one embodiment of the present invention.

FIG. 2 shows one exemplary process 200 executed by the allocation unit 118. The tap distribution process 200 is based on a channel dispersion determined for each carrier. The allocation unit 118 determines the RMS delay spread $\tau_{RMS}$ for each carrier, which provides a reliable indicator of the channel dispersion for each carrier (block 210). Allocation unit 118 then compares each calculated $\tau_{RMS}$ to a dispersion threshold $\psi_{disp}$, which is selected to generally indicate whether or not the carrier has low or high dispersion (block 220). For example, a dispersion threshold of $\psi_{disp}=0.18$ μs may be used to generally indicate whether or not a carrier has low or high dispersion. If $\tau_{RMS}<\psi_{disp}$ for a given carrier (block 220), indicating light channel dispersion for that carrier, the allocation unit 118 allocates a predetermined minimum number of processing delays to that carrier (block 230). However, if $\tau_{RMS}\geq\psi_{disp}$ for a given carrier indicating high channel dispersion for that carrier (block 220), the allocation unit 118 distributes the predetermined minimum number of processing delays plus some selected number of additional processing delays to the carrier (block 240). The process associated with blocks 220-240 is repeated for each carrier. It will be appreciated that the present invention is not limited to the threshold criterion described herein for process 200; other criteria may be used. For simplicity, the following refers to the carriers having a high channel dispersion as "dispersive carriers."

The RMS delay spread used by process 200 may be determined according to any known means. For example, the allocation unit 118 may compute $\tau_{RMS}$ for each of the j=$\{1, 2, \ldots, J\}$ carriers according to:

$$P = \hat{h}^H \hat{h} \qquad (1)$$

$$\tau_{COG} = \frac{1}{P}\sum_{k=0}^{L-1} |\hat{h}_k|^2 \hat{\tau}_k$$

$$\tau_{RMS} = \sqrt{\frac{1}{P}\sum_{k=0}^{L-1} |\hat{h}_k|^2 \hat{\tau}_k^2 - \tau_{COG}^2}.$$

In Equation (1), $\hat{h}=[\hat{h}_1, \hat{h}_2, \ldots, \hat{h}_{L-1}]^T$ represents a vector of estimated net channel coefficients for the delays reported by a delay searcher, including the effects of the radio channel coefficients as well as the effects of the transmit and receive filters, L represents the number of delays, $\hat{\tau}_k$ represents the $k^{th}$ estimated delay, and $\tau_{COG}$ represents the center of gravity delay. Alternatively, the allocation unit 118 may compute the $\tau_{RMS}$ for each of the $j=\{1, 2, \ldots, J\}$ carriers according to:

$$P = \sum_{k=0}^{N_p} PDP_k \quad (2)$$

$$\tau_{COG} = \frac{1}{P} \sum_{k=0}^{N_p-1} PDP_k \hat{\tau}_k$$

$$\tau_{RMS} = \sqrt{\frac{1}{P} \sum_{k=0}^{L-1} PDP_k \hat{\tau}_k^2 - \tau_{COG}^2},$$

where $PDP_k$ represents the $k^{th}$ sample of the power distribution profile, $\hat{\tau}_k$ represents the delay associated with the $k^{th}$ PDP sample, and $N_p$ represents the number of PDP samples. It will be appreciated that the RMS delay spread provided by either Equation (1) or Equation (2) may be smoothed using a simple filter, e.g., an FIR or IIR filter. Alternatively, non-linear smoothing/filtering, e.g., median filtering, may be used to increase the reliability of the RMS delay spread metric. Process 200 may distribute the taps based on either the non-smoothed or the smoothed value of $\tau_{RMS}$.

Allocation unit 118 may distribute the additional taps among the dispersive carriers using any desired means. For example, the allocation unit 118 may distribute the additional taps based on signal-to-noise ratios (SIRs) computed for the carriers, as described in U.S. patent application Ser. No. 12/391,371 filed 24 Feb. 2009, which is incorporated herein by reference. The following describes how the SIR may be used to distribute the additional processing delays.

Figure 3:
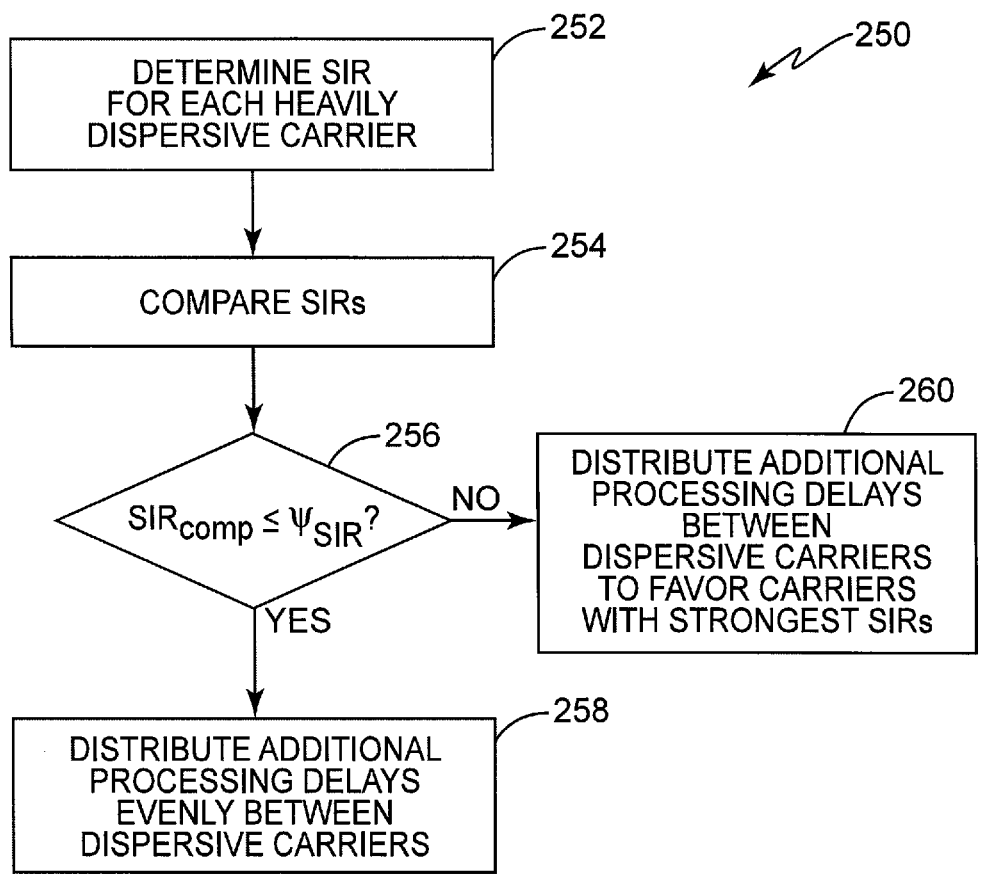
FIG. 3 shows an exemplary SIR-based method for distributing the additional processing delays among dispersive carriers according to one embodiment of the present invention.

FIG. 3 shows one exemplary process 250 for distributing the additional processing delays to the dispersive carriers when the total number of desired additional processing delays for the dispersive carriers exceeds the total number of additional processing delays available from the common delay pool 130. The additional delay distribution process 250 is based on signal-to-interference ratios (SIRs) determined for each dispersive carrier. It will be appreciated that the SIRs may include the effects of both noise and interference.

For simplicity, process 250 is described for two dispersive carriers. The allocation unit 118 determines $SIR_1$ and $SIR_2$ for respective carrier input signals $r_1$ and $r_2$ (block 252). The allocation unit 118 then compares $SIR_1$ and $SIR_2$ to determine a comparison metric $SIR_{comp}$ (block 254), and compares $SIR_{comp}$ to a threshold, where the threshold is selected to generally indicate whether or not $SIR_1$ and $SIR_2$ differ by a small amount (block 256). For example, a threshold of $\psi_{SIR}$=0.5 dB may be used to generally indicate whether or not $SIR_1$ and $SIR_2$ differ by more than 0.5 dB. If $SIR_{comp} \leq \psi_{SIR}$ (block 256), indicating that the difference between $SIR_1$ and $SIR_2$ is small, the allocation unit 118 distributes the processing delays evenly between the dispersive carriers (block 258). However, if $SIR_{comp} > \psi_{SIR}$ (block 256), indicating that the difference between $SIR_1$ and $SIR_2$ is large, the allocation unit 118 distributes the processing delays among the carriers to favor the carrier with the strongest SIR (block 260).

It will be appreciated that embodiments of the present invention are not limited to the threshold criterion described herein for process 250; other criteria may be used. It will also be appreciated that a basic embodiment of process 250 may omit the even delay distribution option, and instead may always distribute the processing delays to favor the carrier with the strongest SIR. Thus, blocks 256 and 258 in FIG. 3 are optional.

The following describes different methods for distributing the additional processing delays among $r_1$ and $r_2$ to favor the carrier with the larger SIR when the total number of desired additional processing delays for the carriers exceeds the total number of available additional processing delays, e.g., $\tilde{N}_{1\_add} + \tilde{N}_{2\_add} > N_{add\_total}$. In the following examples, it is assumed that the first carrier has the largest SIR. It will be appreciated that embodiments of the present invention are not limited to the specific delay distribution methods described herein.

Figure 4:
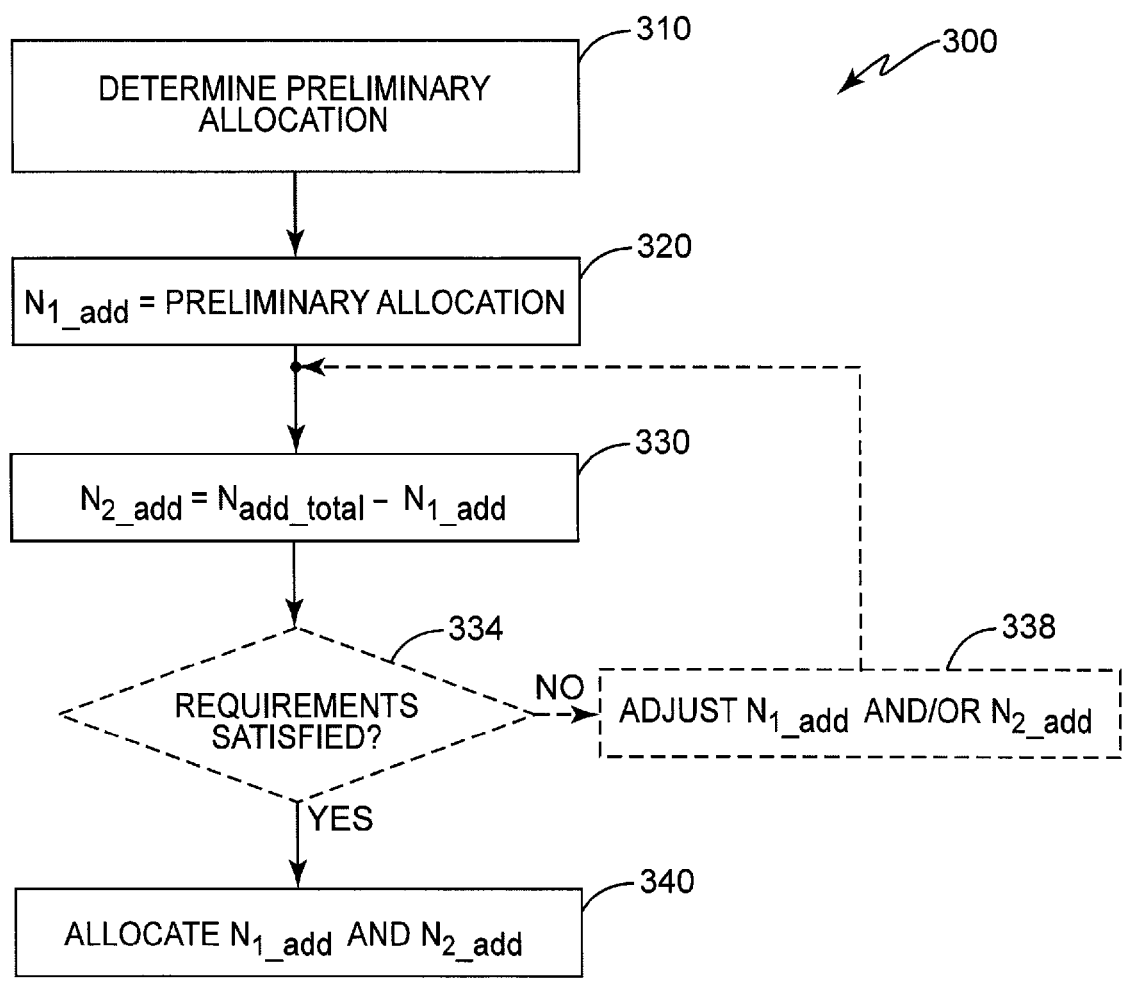
FIG. 4 shows an exemplary method for distributing the additional processing delays among the dispersive carriers to favor the carrier(s) with the strongest SIR(s).

FIG. 4 shows one exemplary method 300 for distributing the additional delays to favor the dispersive carrier(s) with the larger SIR(s). For simplicity, process 300 is described for two dispersive carriers. Allocation unit 118 determines a preliminary allocation for the additional processing delays (block 310), and initially allocates the additional processing delays to the first carrier by setting $N_{1\_add}$ equal to the preliminary allocation (block 320). For example, the allocation unit 118 may determine a preliminary allocation based on a relative comparison between $\tilde{N}_{1\_add}$ and a delay differential, e.g., $N_{add\_total} - (\text{card}(\tau_2) - N_{2\_min})$ (block 310), where $\text{card}(\tau_2)$ represents the number of second carrier path delays. Subsequently, the allocation unit 118 initially allocates $N_{1\_add}$=min$(\tilde{N}_{1\_add}, N_{add\_total} - (\text{card}(\tau_2) - N_{2\_min}))$ processing delays to the first carrier (block 320). The allocation unit 118 then initially allocates the remaining processing delays, e.g., $N_{2\_add} = N_{add\_total} - N_{1\_add}$, to the second carrier (block 330).

In some embodiments, the allocation unit 118 uses the initial allocation as the final allocation (block 340). However, other optional embodiments may further consider one or more predefined receiver requirements when distributing the processing delays. As long as the delay distribution satisfies the predefined receiver requirement(s) (block 334), the allocation unit 118 distributes the initially allocated $N_{1\_add}$ processing delays to the first carrier and the initially allocated $N_{2\_add}$ processing delays to the second carrier (block 340). However, if the initial processing delay allocations do not satisfy the predefined requirement(s), the allocation unit 118 adjusts the initial processing delay allocations for the first carrier and/or the second carrier until the predetermined requirements are satisfied (block 338). For example, the allocation unit 118 may adjust $N_{1\_add}$ and/or $N_{2\_add}$ to ensure that the allocation unit 118 has a sufficient number of computational cycles to compute the combining weights for the allocated $N_{1\_add} + N_{1\_min}$ and $N_{2\_add} + N_{2\_min}$ processing delays, as discussed further below.

In another exemplary embodiment, the allocation unit 118 uses a scaling factor $\beta_1$ to enable external factors, e.g., Doppler frequency, to control how the finger allocation favors the carrier with the higher SIR. The scaling factor $\beta_1$ is a value between 0.0 and 1.0 and may be fixed or periodically updated based on current channel or communication conditions. A scaling factor of 0.0 corresponds to granting a carrier 0% of the desired number of additional processing delays, while a scaling factor of 1.0 corresponds to granting the carrier 100% of the desired number of additional processing delays.

For the scaling embodiment, the preliminary allocation is determined based on a relative comparison between the total number of additional processing delays $N_{add\_total}$ and the scaled version of the desired number of additional processing delays for the first carrier $\beta_1 \tilde{N}_{1\_add}$ (block 310), wherein the allocation unit 118 initially allocates $N_{1\_add}$=min(floor$(\beta_1 \tilde{N}_{1\_add}), N_{add\_total}$) processing delays to the first carrier (block 320). Subsequently, allocation unit 118 initially allocates $N_{2\_add} = N_{add\_total} - N_{1\_add}$ processing delays to the second carrier (block 330). The allocation unit 118 then optionally considers any predefined receiver requirements before finally allocating $N_{1\_add}$ processing delays to the first carrier and updating the allocation of $N_{2\_add}=N_{add\_total}-N_{1\_add}$ processing delays to the second carrier (blocks 334, 338, 340).

In one exemplary embodiment, the allocation unit 118 sets $\beta_1=1.0$. This scaling factor guarantees that the carrier with the highest SIR will be granted as many additional delays as possible regardless of any other system conditions.

In another embodiment, the scaling factor $\beta_1$ may be periodically adjusted based on current conditions, e.g., the Doppler frequency shift of the carriers. For example, the carrier experiencing a higher Doppler shift may be allocated slightly fewer additional delays. This option accounts for the fact that processing in linear equalization receivers is generally less effective in the presence of high Doppler shifts, and therefore compensates for the problem that may arise when two mobile devices traveling at the same speed are associated with different carrier frequencies, and therefore have different Doppler shifts. Another embodiment may determine a final scaling factor $\beta_1$ based on a combination of multiple different determination methods.

As mentioned above, when distributing the processing delays, the allocation unit 118 may also consider the additional number of computational cycles required to determine the combining weights for the allocated processing delays. In general, X computational cycles are required to determine the combining weights for the already allocated minimum number of processing delays. The allocation unit 118 may distribute the additional processing delays so that the total number of additional computational cycles required for the additional processing delays allocated to the dispersive carriers does not exceed the maximum number of additional computational cycles, e.g., cycles($N_{1\_add}$)+cycles($N_{2\_add}$)≤cycles$_{max}$−X, where cycles(x) represents the number of computational cycles required to calculate x combining weights for x delays. If the total number of additional computational cycles exceeds the maximum number of additional cycles available, the allocation unit 118 may iteratively remove one additional processing delay from each carrier's additional allocation until the total number of additional computational cycles required for the additional processing delays does not exceed the maximum number of additional computational cycles available to the receiver.

Alternatively, the allocation unit 118 may consider the computational cycles separately for each carrier when distributing the processing delays. For example, the allocation unit 118 may allocate $N_{1\_add}$ additional processing delays to $r_1$, where $N_{1\_add}$ is the maximum number of additional processing delays satisfying both $N_{1\_add}\leq\min(\tilde{N}_{1\_add}, N_{add\_total}-\text{card}(\tau_2)-N_{2\_min}))$ and cycles($N_{1\_add}$)≤cycles$_{max}$−X−cycles(card($\tau_2$)). Alternatively, the allocation unit 118 may allocate $N_{1\_add}$ additional processing delays to $r_1$, where $N_{1\_add}$ is the maximum number of additional processing delays satisfying both $N_{1\_add}\leq\min(\text{floor}(\beta\tilde{N}_{1\_add})), N_{add\_total})$ and cycles($N_{1\_add}$)≤cycles$_{max}$−X. In either case, the allocation unit 118 may allocate $N_{2\_add}=N_{add\_total}-N_{1\_add}$ additional processing delays to $r_2$.

Figure 5:
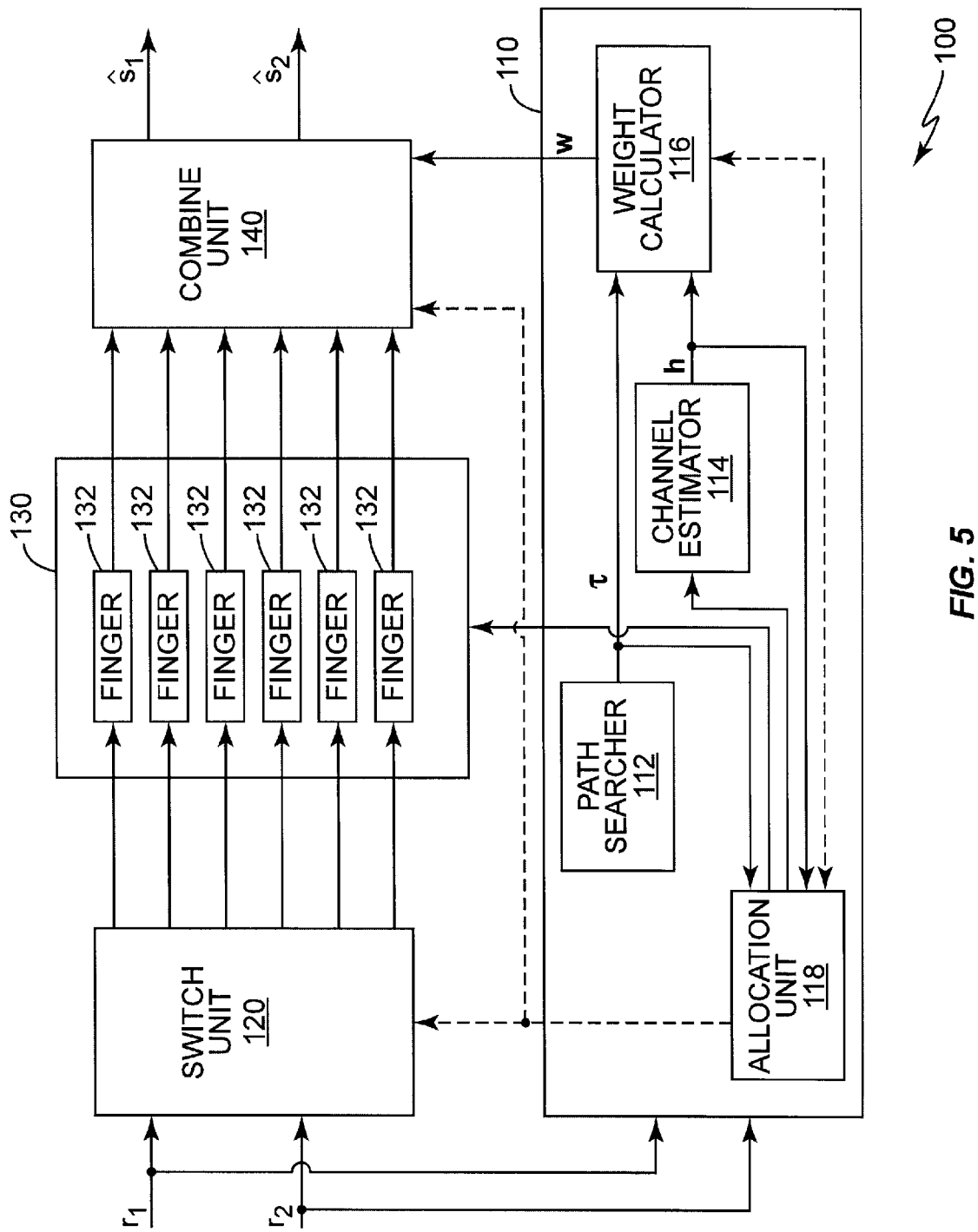
FIG. 5 shows a block diagram of an exemplary multi-carrier RAKE system for the receiver of FIG. 1.

FIG. 5 shows one exemplary multi-carrier linear equalization system 100 comprising a multi-carrier RAKE system according to one embodiment of the present invention, where the RAKE fingers are tuned to the processing delays described above. Multi-carrier RAKE system 100 includes a RAKE processor 110, a switch unit 120, the delay pool 130 comprising a plurality of RAKE fingers 132 (here the term "finger" is used interchangeably with the term "delay" as delays are associated with fingers), and a RAKE combine unit 140. While FIG. 5 only shows two carriers and six RAKE fingers 132, it will be appreciated that the multi-carrier RAKE system 100 may be used for any number of carriers and that the delay pool 130 may include any number of RAKE fingers 132.

Processor 110 distributes the RAKE fingers 132 among the carriers, provides the corresponding path delays and combining weights for each carrier, and generates control signals for the switch unit 120 and combine unit 140 based on the determined finger distribution. Switch unit 120 selectively connects each of the baseband signals $r_1$ and $r_2$ to the allocated RAKE fingers 132 responsive to the control signal. The RAKE fingers 132 delay and despread different images of the input signals $\{r_1, r_2\}$ to generate despread symbol streams. The combine unit 140 weights and combines the despread symbol streams for each carrier to generate the symbol estimates $\hat{s}_1$ and $\hat{s}_2$ for each carrier.

The processor 110 includes a path searcher 112, channel estimator 114, weight calculator 116, and allocation unit 118. The path searcher 112 determines a set of path delays $\tau_j$ for each of the carriers based on the input signals $r_j$, while the channel estimator 114 determines channel estimates $h_j$ for the paths determined by the allocation unit 118. The weight calculator 116 determines a set of combining weights $w_j$ allocated to each carrier based on the finger delays and channel estimates. The allocation unit 118 distributes the RAKE fingers 132 according to the processes discussed above. Once allocation unit 118 determines the finger distribution, the allocation unit 118 generates the corresponding control signal for the switch unit 120 and the combine unit 140. Further, the allocation unit 118 generates a control signal for the weight calculator 116 to match the combining weights with the correct RAKE fingers 132.

Figure 6:
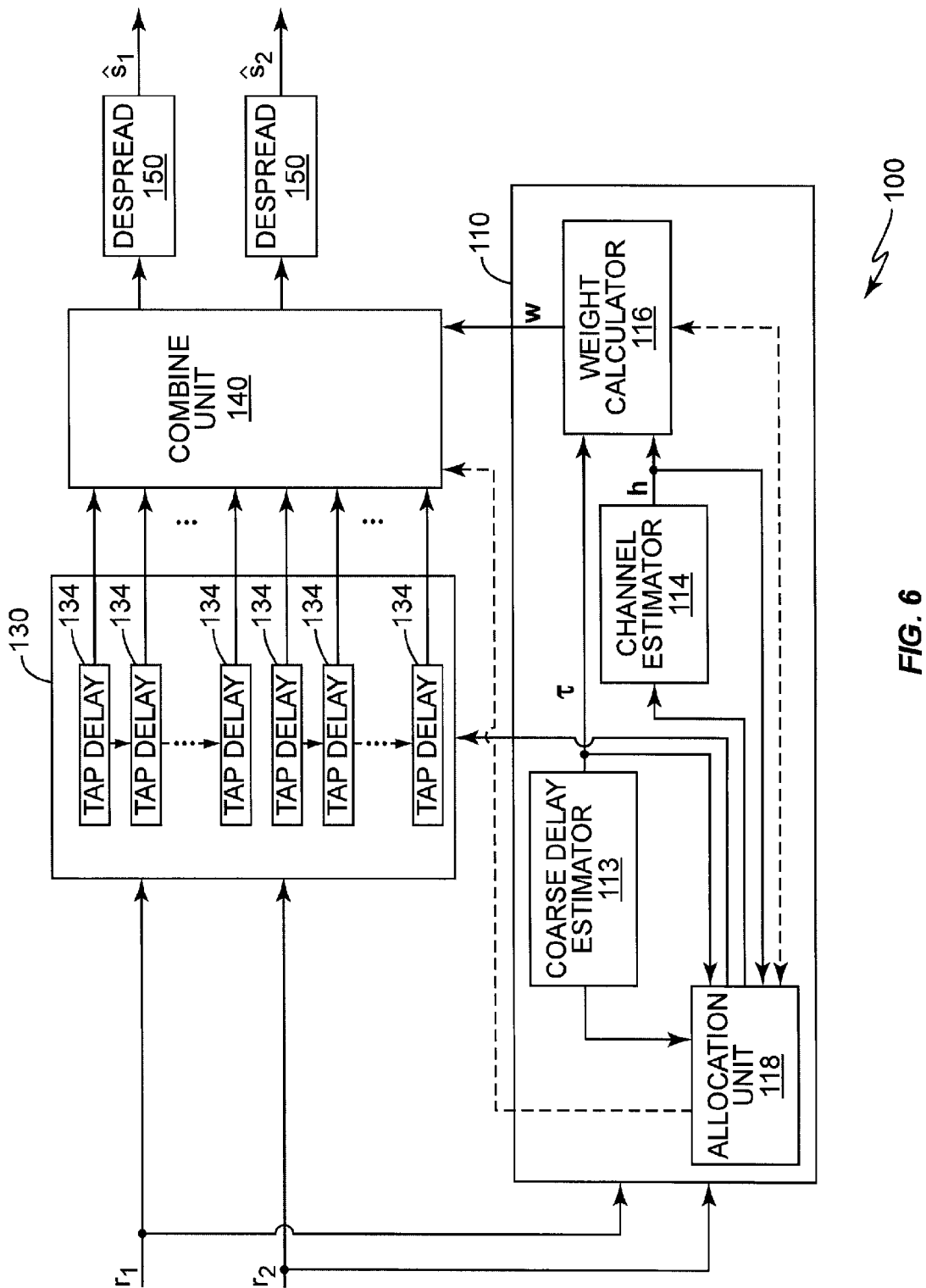
FIG. 6 shows a block diagram of an exemplary multi-carrier chip equalization system for the receiver of FIG. 1.

FIG. 6 shows another exemplary multi-carrier linear equalization system 100 comprising a multi-carrier chip equalization system according to one embodiment of the present invention, where the processing delays described above comprise linear filter tap delays. Multi-carrier chip equalization system 100 includes a processor 110, the delay pool 130 comprising a plurality of tap delays 134, a combine unit 140, and despread units 150. While FIG. 6 only shows two carriers, it will be appreciated that the multi-carrier chip equalization system 100 may be used for any number of carriers.

Processor 110 distributes the delay taps 134 among the carriers, provides the corresponding processing delays and combining weights for each carrier, and generates control signals for the combine unit 140 based on the determined tap distribution. The tap delays 134, the number of which is allocated to each carrier by the allocation unit 118, successively delay the corresponding input signal according to the delay values of the tap delays 134. The combine unit 140 weights and combines the successively delayed samples for each carrier to generate chip estimates. Despread units 150 despread the chip estimates to generate the symbol estimates $\hat{s}_1$ and $\hat{s}_2$ for each carrier.

The processor 110 includes a coarse delay estimator 113, channel estimator 114, weight calculator 116, and allocation unit 118. The coarse delay estimator 113 determines the delay value for each tap delay 134 using any known means, while the channel estimator 114 determines channel estimates $h_j$ associated with the tap delays determined by the allocation unit 118. The weight calculator 116 determines the combining weight $w_j$ corresponding to each tap delay 134 based on the received signals and channel estimates. The allocation unit 118 distributes the tap delays 134 according to the processes discussed above. Once allocation unit 118 determines the tap delay distribution, the allocation unit 118 generates the corresponding control signal for the combine unit 140. Further, the allocation unit 118 generates a control signal for the weight calculator 116 to match the combining weights with the correct tap delays 134.

While not explicitly shown, the present invention also applies to other linear equalization receivers that process time-aligned signals and/or sample sets corresponding to a transmitted signal. Regardless of the type of receiver, the present invention allocates processing delays to each carrier of a multi-carrier signal based on channel dispersion, and in some cases, SIR.

The SIR-based embodiments discussed herein are described in terms of a two-carrier system. However, each embodiment may be extended to a multi-carrier system having more than two dispersive carriers. The extended multi-carrier solution of embodiments of the present invention assumes that the total number of additional processing delays desired for all dispersive carriers, exceeds the total number of additional processing delays available in the common delay pool 130, e.g., $$\sum_{i=1}^{I} \tilde{N}_{i\_add} > N_{add\_total},$$

and that $SIR_1 \geq SIR_2 \geq \ldots \geq SIR_I$ for the I dispersive carriers. While not required, the following descriptions include the computational cycle requirement when distributing the additional processing delays 132, 134 based on SIR.

For the extended multi-carrier solution, the comparison metric $SIR_{comp}$ is derived from the difference between the largest and smallest SIRs, e.g., $SIR_1$ and $SIR_I$, respectively, for the dispersive carriers. When none of the dispersive carriers have a dominant SIR, e.g., when $SIR_{comp}$ is less than or equal to a threshold, the allocation unit 118 evenly distributes the additional processing delays 132, 134 among the dispersive carriers. For example, the allocation unit 118 may allocate $$N_{even} = \min\left(\tilde{N}_{i\_add}, \frac{N_{add\_total}}{I}\right)$$

additional processing delays 132, 134 to each of the I dispersive carriers. When the allocation unit 118 also considers the number of additional computational cycles, the allocation unit 118 may further limit $N_{even}$ to the maximum number of processing delays satisfying $$\text{cycles}(N_{even}) \leq \frac{cycles_{max} - X}{I},$$

where cycles(x) represents the number of computational cycles required to calculate x combining weights for x delays.

When the comparison metric exceeds the threshold, e.g., when $SIR_1 >> SIR_I$, the allocation unit 118 favors the dispersive carrier(s) with the stronger SIR(s). More particularly, the allocation unit 118 will, in this example, favor the first carrier over the second carrier, the second carrier over the third carrier, etc. For example, the allocation unit 118 may distribute the additional processing delays 132, 134 among the carriers based on the number of path delays for the different carriers. First, the allocation unit 118 determines the maximum number of additional processing delays 132, 134 for the first dispersive carrier ($N_{1\_add}$) that satisfy $$N_{1\_add} \leq \min\left(\tilde{N}_{1\_add}, N_{add\_total} - \sum_{i=2}^{I}(\text{card}(\tau_i) - N_{i\_min})\right),$$

and optionally $$\text{cycles}(N_{1\_add}) \leq \left(cycles_{max} - X - \sum_{i=2}^{I}\text{cycles}(\text{card}(\tau_i))\right),$$

where cycles(x) represents the number of computational cycles required to calculate x combining weights for x delays. Subsequently, the allocation unit 118 determines the maximum number of additional processing delays 132, 134 for the second carrier ($N_{2\_add}$) that satisfy $$N_{2\_add} \leq \min\left(\tilde{N}_{2\_add}, N_{add\_total} - N_{1\_add} - \sum_{i=3}^{I}(\text{card}(\tau_i) - N_{i\_min})\right),$$

and optionally $$\text{cycles}(N_{2\_add}) \leq \left(cycles_{max} - X - \text{cycles}(N_{1\_add}) - \sum_{i=3}^{I}\text{cycles}(\text{card}(\tau_i))\right).$$

This process continues until the allocation unit 118 allocates the number of processing delays 132, 134 for the carrier with the lowest SIR by determining the maximum value for $N_I$ that satisfies $$N_{I\_add} = \min\left(\tilde{N}_{I\_add}, N_{add\_total} - \sum_{i=1}^{I-1}N_{i\_add}\right),$$

and optionally $$\text{cycles}(N_{I\_add}) \leq \left(cycles_{max} - X - \sum_{i=1}^{I-1}\text{cycles}(N_{i\_add})\right).$$

The scaling factor-based distribution embodiment discussed above may also be used for the extended multi-carrier solution. In this case, the allocation unit 118 may use a carrier-specific scaling factor to determine $N_{i\_add}$ for each carrier. Each scaling factor $\beta_i$ may be any value between 0.0 and 1.0, and may be determined according to any of the embodiments discussed above. First, the allocation unit 118 determines the maximum value for $N_{1\_add}$ that satisfies $N_{1\_add} \leq \min(\text{floor}(\beta_1 \tilde{N}_{1\_add}), N_{add\_total})$, and optionally $\text{cycles}(N_{1\_add}) \leq cycles_{max} - X$. Subsequently, the allocation unit 118 determines the maximum value for $N_{2\_add}$ that satisfies $N_{2\_add} \leq \min(\text{floor}(\beta_2 \tilde{N}_{1\_add}), N_{add\_total} - N_{1\_add})$, and optionally $\text{cycles}(N_{2\_add}) \leq (cycles_{max} - X - \text{cycles}(N_{1\_add}))$. This process continues until the allocation unit 118 allocates the number of additional processing delays for the carrier with the lowest SIR by determining the maximum value for $N_{1\_add}$ that satisfies $$N_{l\_add} \leq \min\left(\text{floor}(\beta_l \tilde{N}_{l\_add}), N_{add\_total} - \sum_{i=1}^{l-1} N_{ji\_add}\right),$$

and optionally $$\text{cycles}(N_{l\_add}) \leq \left(\text{cycles}_{max} - X - \sum_{i=1}^{l-1} \text{cycles}(N_{i\_add})\right).$$

The above describes how multi-carrier linear equalization systems 100 may distribute a common pool 130 of processing delays 132, 134 among carriers, even when the multi-carrier linear equalization system 100 limits the number of available processing delays 132, 134 to reduce the complexity of the system 100. Thus, embodiments of the present invention reduce the complexity associated with conventional multi-carrier linear equalization systems without sacrificing performance. Further, one key advantage of the dispersion-based aspect of the present invention is that the RMS delay spread metric is easily computed and reliably indicates the channel dispersion for each carrier. Further, the present invention is simple and can allocate processing delays without needing past or future information, which eliminates the need for buffering.

Embodiments of the present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of allocating a plurality of processing delays in a wireless multi-carrier receiver, the method comprising:
    determining a channel dispersion for each of a plurality of carriers received by the multi-carrier receiver;
    determining a variable number of processing delays for each of the plurality of carriers based on the channel dispersions, wherein the variable number of processing delays comprise a finger bank comprising a variable number of RAKE fingers or a tap bank comprising a variable number of taps;
    processing each of the received carriers using the number of processing delays determined for the corresponding carrier; and
    wherein determining the variable number of processing delays for each of the plurality of carriers based on the channel dispersions comprises:
        allocating a minimum number of processing delays to each received carrier;
        identifying dispersive carriers by determining which carriers, if any, have a channel dispersion greater than or equal to a dispersion threshold; and
        determining a signal-to-interference ratio for each of the dispersive carriers;
        allocating one or more additional processing delays among the dispersive carriers by:
            comparing the signal-to-interference ratio determined for one dispersive carrier with the signal-to-interference ratio determined for another dispersive carrier to determine a comparison metric; and
            allocating the one or more additional processing delays to favor the dispersive carrier with the larger signal-to-interference ratio when the comparison metric meets a first criteria.

2. The method of claim 1 further comprising dividing the one or more additional processing delays equally among the dispersive carriers when the comparison metric meets a second criteria.

3. The method of claim 1 wherein allocating the one or more additional processing delays to favor the dispersive carrier with the larger signal-to-interference ratio comprises:
    determining a desired number of first processing delays for the dispersive carrier having the larger signal-to-interference ratio;
    determining a preliminary allocation based on a total number of available additional processing delays and the desired number of first processing delays; and
    allocating a first number of the one or more additional processing delays to the dispersive carrier having the larger signal-to-interference ratio based on the preliminary allocation.

4. The method of claim 1 wherein:
    comparing the signal-to-interference ratio determined for one dispersive carrier with the signal-to-interference ratio determined for another dispersive carrier comprises comparing the largest signal-to-interference ratio to the smallest signal-to-interference ratio to determine the comparison metric;
    the first criteria involves a signal-to-interference threshold;
    allocating the one or more additional processing delays comprises:
        allocating the one or more additional processing delays equally among the dispersive carriers when the comparison metric is less than or equal to the signal-to-interference threshold; and
        allocating the one or more additional processing delays among the dispersive carriers so as to favor the dispersive carriers with the larger signal-to-interference ratios when the comparison metric exceeds the signal-to-interference threshold.

5. The method of claim 2 wherein the first criteria corresponds to exceeding a signal-to-interference threshold, and wherein the second criteria corresponds to being less than or equal to the signal-to-interference threshold.

6. The method of claim 3 wherein determining the variable number of processing delays further comprises allocating the remaining additional processing delays to the other dispersive carrier.

7. The method of claim 3 wherein determining the preliminary allocation comprises:
    scaling the desired number of first processing delays by a scaling factor, wherein the scaling factor comprises a number between 0.0 and 1.0;
    setting a floor value equal to the largest integer less than or equal to the scaled desired number of first processing delays; and
    setting the preliminary allocation equal to the smaller of the total number of available additional processing delays and the floor value.

8. A multi-carrier receiver comprising:
    a delay bank comprising a plurality of processing delays, wherein the delay bank of processing delays comprises a finger bank of RAKE finger delays or a tap bank of taps; and
    a processor configured to:
        determine a channel dispersion for each of a plurality of carriers received by the multi-carrier receiver;

determine a variable number of the plurality of processing delays for each of the plurality of carriers based on the channel dispersions; and wherein the processor determines the variable number of processing delays for each of the plurality of carriers based on the channel dispersions by:

allocating a minimum number of processing delays to each received carrier;

identifying dispersive carriers by determining which carriers, if any, have a channel dispersion greater than or equal to a dispersion threshold; and determining a signal-to-interference ratio for each of the dispersive carriers;

allocating one or more additional processing delays among the dispersive carriers by:

comparing the signal-to-interference ratio determined for one dispersive carrier with the signal-to-interference ratio determined for another dispersive carrier to determine a comparison metric; and allocating the one or more additional processing delays to favor the dispersive carrier with the larger signal-to-interference ratio when the comparison metric meets a first criteria;

wherein the delay bank processes each of the received carriers using the number of processing delays determined for the corresponding carrier.

9. The multi-carrier receiver of claim 8 wherein the processor is further configured to divide the one or more additional processing delays equally among the dispersive carriers when the comparison metric meets a second criteria.

10. The multi-carrier receiver of claim 8 wherein the processor is configured to allocate the one or more additional processing delays to favor the dispersive carrier having the larger signal-to-interference ratio by:

determining a desired number of first processing delays for the dispersive carrier having the larger signal-to-interference ratio;

determining a preliminary allocation based on a total number of available additional processing delays and the desired number of first processing delays; and allocating a first number of the one or more additional processing delays to the dispersive carrier having the larger signal-to-interference ratio based on the preliminary allocation.

11. The multi-carrier receiver of claim 8 wherein:

the processor compares the signal-to-interference ratio determined for one dispersive carrier with the signal-to-interference ratio determined for another dispersive carrier by comparing the largest signal-to-interference ratio to the smallest signal-to-interference ratio to determine the comparison metric;

the first criteria involves a signal-to-interference threshold;

the processor allocates the one or more additional processing delays by:

allocating the one or more additional processing delays equally among the dispersive carriers when the comparison metric is less than or equal to the signal-to-interference threshold; and allocating the one or more additional processing delays among the dispersive carriers so as to favor the carriers with the larger signal-to-interference ratios when the comparison metric exceeds the signal-to-interference threshold.

12. The multi-carrier receiver of claim 8, wherein the processor is further configured to generate a distribution control signal based on the variable number of processing delays determined for each of the plurality of carriers; and wherein the multi-carrier receiver further comprises:

a switch unit configured to connect the processing delays in the delay bank to input signals associated with the different carriers responsive to the control signal; and a combine unit comprising a plurality of combiners, where each combiner is configured to combine the processing delay outputs responsive to the control signal.

13. The multi-carrier receiver of claim 8 wherein the multi-carrier receiver is disposed in a wireless communication device.

14. The multi-carrier receiver of claim 8 wherein the multi-carrier receiver comprises a multi-carrier RAKE or generalized RAKE receiver, and wherein the delay bank of processing delays comprises the finger bank of RAKE finger delays.

15. The multi-carrier receiver of claim 8 wherein the multi-carrier receiver comprises a multi-carrier chip equalization receiver, and wherein the delay bank of processing delays comprises the tap bank of taps.

16. The multi-carrier receiver of claim 9 wherein the first criteria corresponds to exceeding a signal-to-interference threshold, and wherein the second criteria corresponds to being less than or equal to the signal-to-interference threshold.

17. The multi-carrier receiver of claim 10 wherein the processor is further configured to allocate the remaining additional processing delays to the other dispersive carrier.

18. The multi-carrier receiver of claim 10 wherein the processor is configured to determine the preliminary allocation by:

scaling the desired number of first processing delays by a scaling factor, wherein the scaling factor comprises a number between 0.0 and 1.0;

setting a floor value equal to the largest integer less than or equal to the scaled desired number of first processing delays; and setting the preliminary allocation equal to the smaller of the total number of available additional processing delays and the floor value.

* * * * *

UNITED STATES PATENT AND TRADEMARK OFFICE
CERTIFICATE OF CORRECTION

PATENT NO.        : 8,861,623 B2
APPLICATION NO.   : 12/472742
DATED             : October 14, 2014
INVENTOR(S)       : Jonsson et al.

Page 1 of 1

It is certified that error appears in the above-identified patent and that said Letters Patent is hereby corrected as shown below:

In the specification

In Column 3, Line 45, delete "i{1, 2,..., I}" and insert -- i={1, 2,..., I} --, therefor.

Signed and Sealed this
Seventeenth Day of November, 2015

Michelle K. Lee
*Director of the United States Patent and Trademark Office*